(12) United States Patent
Yoda (10) Patent No.: US 11,750,548 B2
(45) Date of Patent: Sep. 5, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yoshiyuki Yoda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 236 days.

(21) Appl. No.: 17/061,206

(22) Filed: Oct. 1, 2020

(65) Prior Publication Data

US 2021/0250314 A1 Aug. 12, 2021

(30) Foreign Application Priority Data

Feb. 6, 2020 (JP) ................. 2020-018721

(51) Int. Cl.
*G06F 15/16* (2006.01)
*H04L 51/212* (2022.01)
*H04L 67/306* (2022.01)
*H04L 51/046* (2022.01)
*H04L 51/52* (2022.01)

(52) U.S. Cl.
CPC .......... *H04L 51/212* (2022.05); *H04L 51/046* (2013.01); *H04L 51/52* (2022.05); *H04L 67/306* (2013.01)

(58) Field of Classification Search
CPC ..... H04L 51/212; H04L 51/52; H04L 51/046; H04L 67/306

USPC ......................................................... 709/206
See application file for complete search history.

(56) References Cited

U.S. PATENT DOCUMENTS

| | | | |
|---|---|---|---|
| 9,148,333 B2* | 9/2015 | Bustamente | H04L 61/30 |
| 9,185,184 B2* | 11/2015 | Bustamente | H04W 4/21 |
| 9,553,833 B2* | 1/2017 | Chandrasekaran | H04L 51/063 |
| 10,116,614 B1* | 10/2018 | Rihn | H04L 51/212 |
| 10,333,934 B1* | 6/2019 | Fox | H04L 67/02 |
| 10,783,261 B1* | 9/2020 | Gu | G06V 40/172 |
| 10,817,840 B2* | 10/2020 | Zhurakhinskaya | G06Q 50/01 |
| 11,102,244 B1* | 8/2021 | Jakobsson | H04L 51/42 |
| 2008/0301242 A1* | 12/2008 | Akella | G06Q 10/107 709/206 |
| 2011/0173273 A1* | 7/2011 | Krachtus | H04L 63/1483 709/206 |
| 2014/0189539 A1* | 7/2014 | St. Clair | G06Q 30/0241 715/753 |

(Continued)

FOREIGN PATENT DOCUMENTS

| | | |
|---|---|---|
| JP | 2007-139864 A | 6/2007 |
| JP | 2016-181062 A | 10/2016 |
| JP | 2018-200602 A | 12/2018 |

*Primary Examiner* — Anthony Mejia
(74) *Attorney, Agent, or Firm* — Oliff PLC (57) ABSTRACT

An information processing apparatus includes memory and a processor configured to, when conversation information is transmitted and received between plural users, and conversation information that one of the plural users tries to send includes information regarding an external service, acquire user information that is registered in association with the information regarding the service, and inhibit transmission of the conversation information when the acquired user information includes information that identifies the user.

13 Claims, 11 Drawing Sheets

(56) References Cited

U.S. PATENT DOCUMENTS

| | | | |
|---|---|---|---|
| 2016/0094528 A1* | 3/2016 | Gordon | H04L 51/00 709/245 |
| 2017/0039652 A1* | 2/2017 | Sandre | H04L 63/102 |
| 2017/0155624 A1* | 6/2017 | Waytena, Jr. | H04L 51/52 |
| 2017/0324744 A1* | 11/2017 | Rinzler | H04W 4/02 |
| 2018/0019873 A1* | 1/2018 | Kraemer | H04L 67/1097 |
| 2018/0211254 A1* | 7/2018 | Narayanan | G06Q 20/401 |
| 2018/0350144 A1* | 12/2018 | Rathod | G06Q 20/3224 |
| 2020/0036687 A1* | 1/2020 | May | H04W 12/02 |
| 2020/0065523 A1 | 2/2020 | Fukuda | |
| 2020/0195694 A1* | 6/2020 | Kalinin | G06Q 10/107 |
| 2020/0322320 A1* | 10/2020 | Moon | H04L 51/02 |
| 2021/0035576 A1* | 2/2021 | Kang | G10L 15/183 |
| 2021/0037000 A1* | 2/2021 | Attard | H04L 63/102 |
| 2021/0117567 A1* | 4/2021 | Braghin | G06F 21/6245 |

\* cited by examiner

| USER ID | NAME | HOME ADDRESS | TELEPHONE NUMBER | GENDER | AGE |
|---|---|---|---|---|---|
| abcd123 | HANAKO YAMADA | 1-2-3 XX MINATO-KU, TOKYO | 0312345678 | FEMALE | 28 |
| xyz1212 | TARO YAMADA | 3-4 Z TOWN NISHI-KU, YOKOHAMA | 0451114567 | MALE | 34 |
| efgh111 | XMI YAMAMOTO | 4-5-203 ZY SHINAGAWA-KU, TOKYO | 0333334444 | FEMALE | 31 |
| asdf222 | YKO NAKAMURA | 3-9 XZ TOWN KANAGAWA-KU, YOKOHAMA | 0452223333 | FEMALE | 32 |

| USER ID | NAME OF EXTERNAL SNS | ACCOUNT ON EXTERNAL SNS | CHECKING RESULT | CHECKING TIME |
|---|---|---|---|---|
| abcd123 | XXX | abc123456 | INFORMATION IDENTIFYING INDIVIDUAL NOT FOUND | 2019.12.14 14:58 |
| abcd123 | ZZZZ | 385aaaa | INFORMATION IDENTIFYING INDIVIDUAL FOUND | 2019.12.24 13:11 |
| xyz1212 | XXX | a123456 | INFORMATION IDENTIFYING INDIVIDUAL FOUND | 2020.1.10 08:18 |
| xyz1212 | ZZZZ | 4567abc | INFORMATION IDENTIFYING INDIVIDUAL FOUND | 2020.1.15 12:48 |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-018721 filed Feb. 6, 2020.

BACKGROUND

(i) Technical Field

The present disclosure relates to an information processing apparatus and a non-transitory computer readable medium.

(ii) Related Art

Japanese Unexamined Patent Application Publication No. 2007-139864 discloses a suspicious-conversation detection apparatus that determines whether conversation fits one of risky conversation types by dividing the contents of a message sent from a conversation partner into words or clauses and then comparing the words or the clauses with risky keywords that are used for distinguishing the risky conversation types.

Japanese Unexamined Patent Application Publication No. 2016-181062 discloses a poster analysis apparatus that is capable of estimating as much accurately as possible a profile item of a user from a sentence posted by the user.

Japanese Unexamined Patent Application Publication No. 2018-200602 discloses a data transfer method in which, when it is detected that chat data transmitted from a user terminal includes a content related to personal information, a predetermined filtering processing is executed on the chat data.

SUMMARY

Aspects of non-limiting embodiments of the present disclosure relate to providing an information processing apparatus and a non-transitory computer readable medium that enables transmission of conversation information including information regarding an external service while reducing the probability of leakage of information that identifies an individual even in the case where one of a plurality of users tries to send conversation information including information regarding an external service to the other user during transmission and reception of conversation information between the plurality of users.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including memory and a processor configured to, when conversation information is transmitted and received between a plurality of users, and conversation information that one of the plurality of users tries to send includes information regarding an external service, acquire user information that is registered in association with the information regarding the service, and inhibit transmission of the conversation information when the acquired user information includes information that identifies the user.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail below with reference to the drawings.

Figure 1:
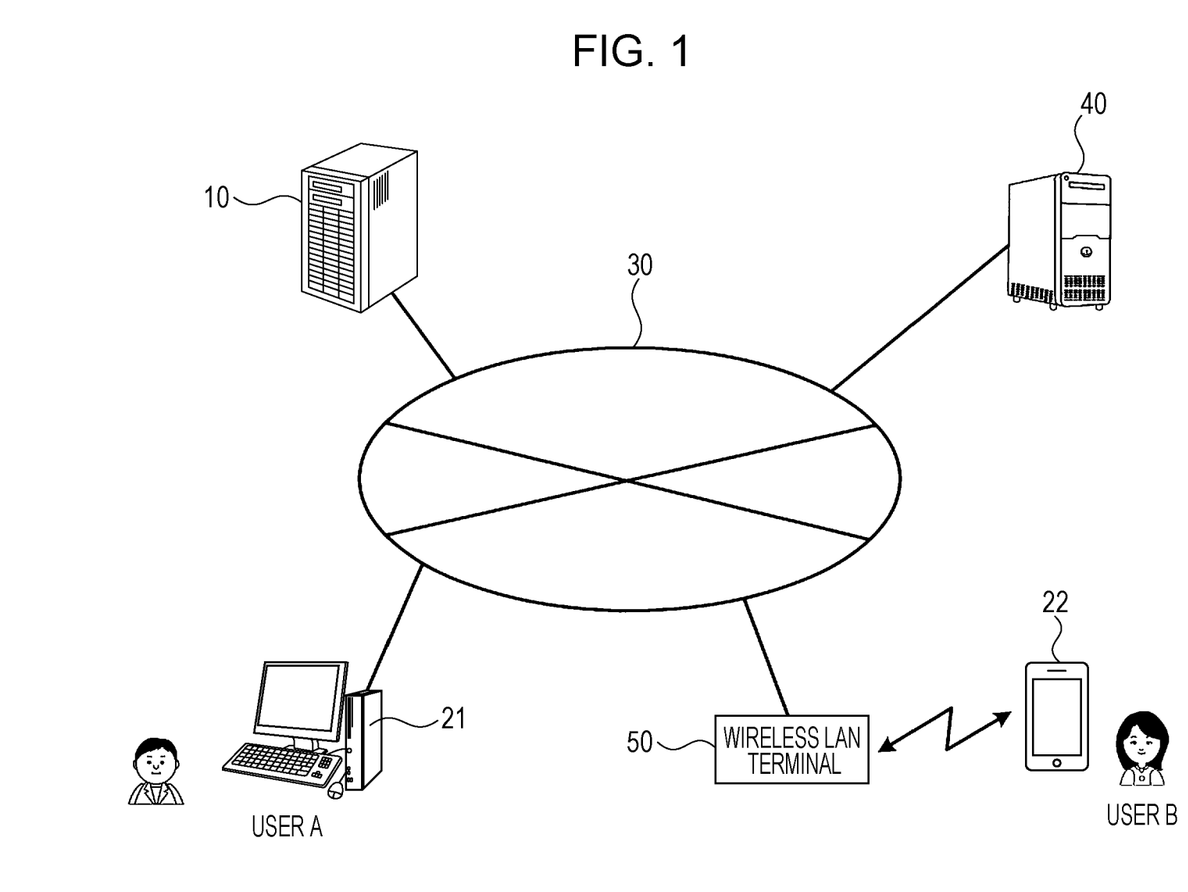
FIG. 1 is a diagram illustrating a system configuration of a matching system according to the exemplary embodiment of the present disclosure.

FIG. 1 is a diagram illustrating a system configuration of a matching system according to the exemplary embodiment of the present disclosure.

The matching system of the exemplary embodiment of the present disclosure has a configuration in which a matching-service providing server 10 is connected to terminal apparatuses 21 and 22 via the Internet 30 as illustrated in FIG. 1. Note that, in the present exemplary embodiment, only two terminal apparatuses, which are the terminal apparatus 21 that is operated by a user A and the terminal apparatus 22 that is operated by a user B, are illustrated in FIG. 1 in order to make the following description simple. In practice, however, a large number of terminal apparatuses are connected to the matching-service providing server 10 via the Internet 30.

Here, the terminal apparatus 22 is a mobile terminal such as a smartphone and is connected to the Internet 30 via a wireless LAN terminal 50. An external SNS server 40 is also connected to the Internet 30.

The external SNS server 40 is a server that is operated by an external social networking service (hereinafter abbreviated to SNS) other than a matching service. Here, examples of the external SNS include various SNSs such as Twitter (Registered Trademark), LINE (Registered Trademark), and Facebook (Registered Trademark).

Note that, in the present exemplary embodiment, only one external SNS server 40 is illustrated in FIG. 1 in order to make the following description simple. In practice, however, a large number of SNS servers are connected to the Internet 30.

The matching-service providing server 10 is an information processing apparatus that provides, to a plurality of users who have been registered in advance, a matching service for, for example, finding a person of the opposite sex who may become a dating partner or a marriage partner. Such a matching service is provided with the aim of enabling each user to find a person of the opposite sex who has the same hobby as the user or who meets a criterion set by the user by browsing profiles of a large number of people of the opposite sex who are registered in the service.

In recent years, matching services for, for example, finding a dating partner or a marriage partner have been widely used. In such matching services, a user sends a message transmission request to another user he/she is interested in, and once the other user has accepted the message transmission request, the two users are brought into a matched state and become capable of transmitting and receiving conversation information to and from each other. As described above, control may be performed in such a manner that users become capable of transmitting and receiving conversation information to and from each other after one of the users has accepted a message transmission request from the other user. Alternatively, a service that enables transmission and reception of conversation information without sending a message transmission request may be assumed.

The type of service is not limited to a matching service such as that described above and may be a service such as job matching for searching a type of job that matches a desired condition and matching a recruitment staff with a job seeker.

Once two users have been brought in the matched state, they are capable of having a chat, which is an interaction that is performed by transmitting and receiving conversation information to and from each other, before actually seeing each other.

In a chat, which is performed in the manner described above, there is a case where a user tries to send conversation information including address information of an external SNS (abbreviation of social networking service) that is different from the matching service, which the user is currently using.

If the user's handle name or the user's self-introduction sentence on such an external SNS includes information such as the user's real name, the user's home address or resident area, the user's telephone number, the user's e-mail address, the name of a school the user attends, or the name of a company the user works for, such information items that identify an individual and with which an individual may be uniquely determined when a stranger accesses these information items will be leaked to the other user.

Accordingly, when a user and another user have a chat on the matching service by transmitting and receiving conversation information to and from each other, if conversation information that the user tries to send includes information regarding the user's account on an external SNS, prohibiting transmission of the conversation content to the other user may be considered.

However, in the case where a user uses such an external SNS anonymously or by using a handle name with which an individual may not be uniquely determined, even if the user sends information regarding the user's account on the external SNS to a chat partner, it is unlikely that leakage of information that identifies an individual will occur.

If transmission of a conversation content including information regarding an account on an external SNS is prohibited in a chat without any exception even in the above case, users who are in the matched state are not able to communicate each other by using the SNS, and this impairs the convenience of the matching service.

Accordingly, in the matching service that is provided by the matching-service providing server 10 of the present exemplary embodiment, processing such as that described below is performed, so that, even in the case where one of a plurality of users tries to send conversation information including information that identifies an individual, such as information regarding the user's account on an external SNS, to the other user during transmission and reception of conversation information between the plurality of users, transmission of conversation information including the account information is enabled while the probability of leakage of information that identifies an individual is reduced.

Figure 2:
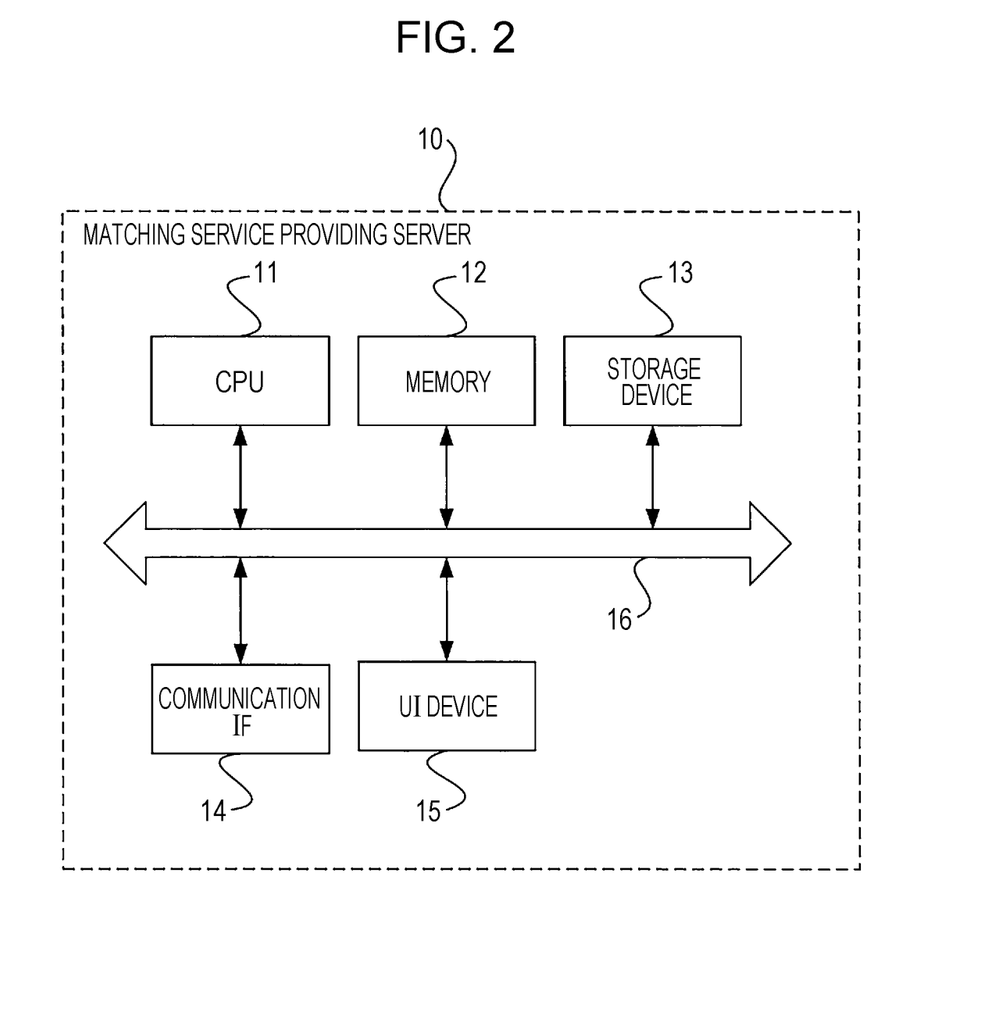
FIG. 2 is a block diagram illustrating a hardware configuration of a matching-service providing server according to the exemplary embodiment of the present disclosure.

Next, FIG. 2 illustrates a hardware configuration of the matching-service providing server 10 in the matching system of the present exemplary embodiment.

As illustrated in FIG. 2, the matching-service providing server 10 includes a CPU 11, memory 12, a storage device 13 such as a hard disk drive, a communication interface (IF) 14 that performs transmission and reception of data with, for example, an external device via the Internet 30, and a user interface (UI) device 15 that includes a touch panel or a liquid crystal display and a keyboard. These components are connected to one another via a control bus 16.

The CPU 11 is a processor that controls the operation of the matching-service providing server 10 by performing predetermined processing on the basis of a control program stored in the memory 12 or the storage device 13. Note that, in the description of the present exemplary embodiment, although the CPU 11 is configured to read and run a control program stored in the memory 12 or the storage device 13, the program may be provided to the CPU 11 by being stored in a storage medium such as a compact disc read-only memory (CD-ROM).

Figure 3:
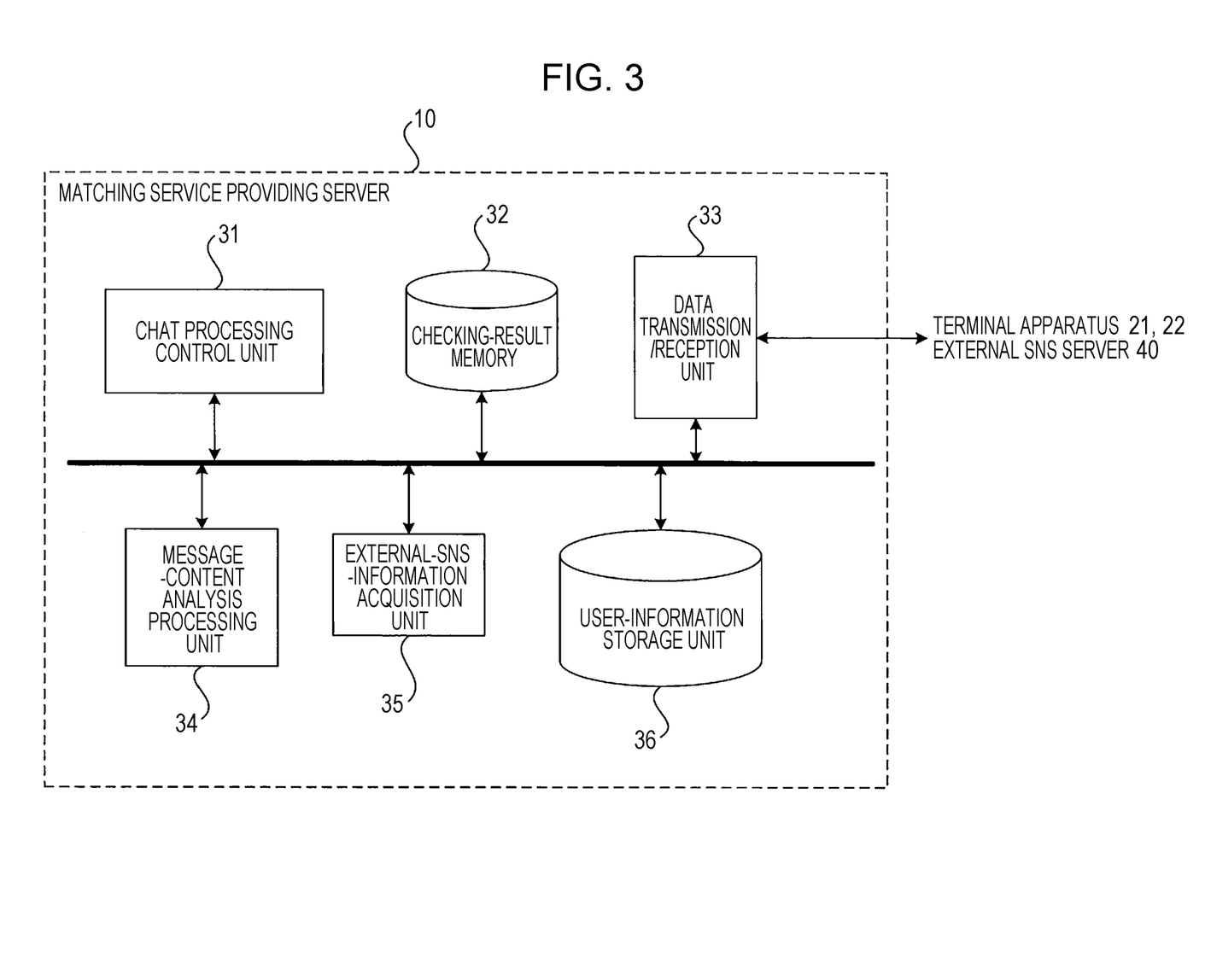
FIG. 3 is a block diagram illustrating a functional configuration of the matching-service providing server according to the exemplary embodiment of the present disclosure.

FIG. 3 is a block diagram illustrating a functional configuration of the matching-service providing server 10 that is constructed by running the above-mentioned control program.

As illustrated in FIG. 3, the matching-service providing server 10 of the present exemplary embodiment includes a chat processing control unit 31, a checking-result memory 32, a data transmission/reception unit 33, a message-content analysis processing unit 34, an external-SNS-information acquisition unit 35, and a user-information storage unit 36. Note that FIG. 3 only illustrates the functional configuration for enabling users who are in the matched state in the matching service to have a chat.

The data transmission/reception unit 33 performs transmission and reception of data with the terminal apparatuses 21 and 22 and the external SNS server 40 via the Internet 30.

The chat processing control unit 31 controls processing of a chat between users and specifically performs control for transmitting conversation information from a user to another user and transmitting conversation information from the other user to the user.

The user-information storage unit 36 stores information items such as names or home addresses that are registered in the matching service and that identify users. In other words, information that identifies each user who has a chat with another user by transmitting and receiving conversation information to and from each other is stored in the user-information storage unit 36.

Figure 4:
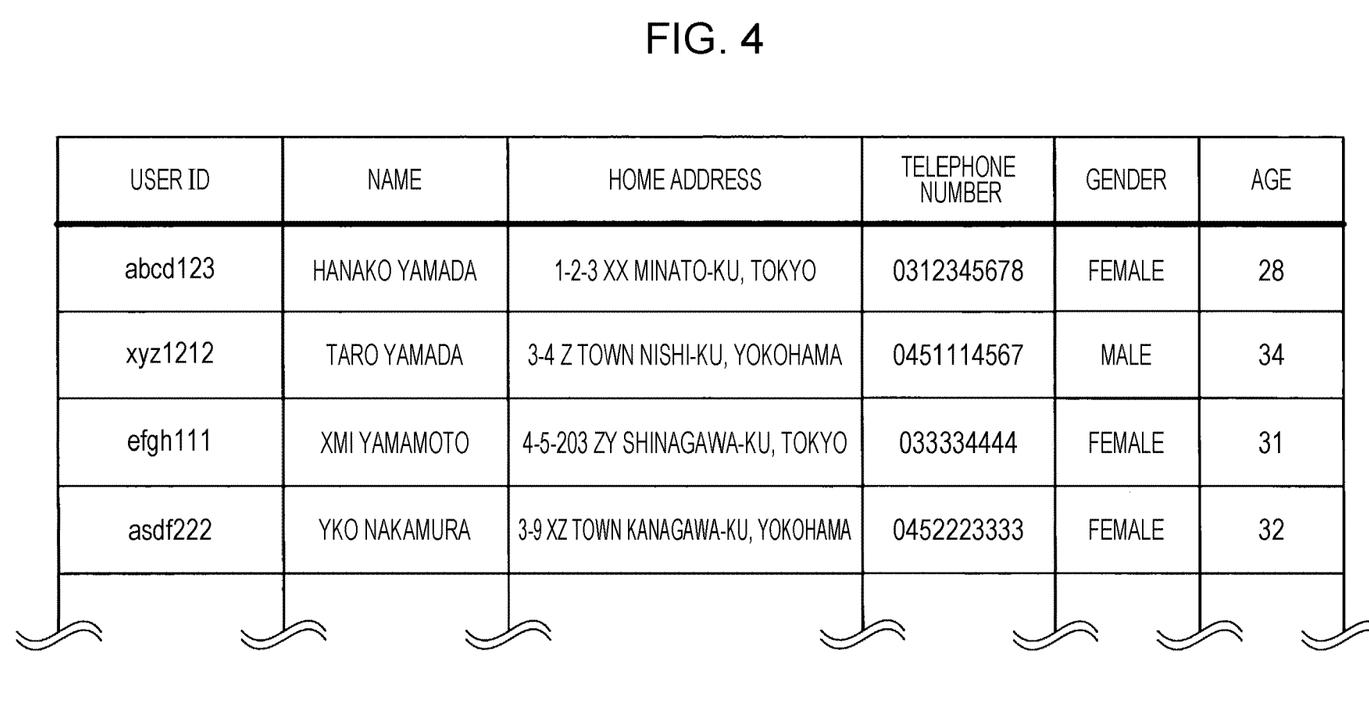
FIG. 4 is a diagram illustrating an example of user information registered in a user-information storage unit that is illustrated in FIG. 3.

Examples of user information items registered in the user-information storage unit 36 are illustrated in FIG. 4. It is understood from FIG. 4 that various information items each of which identifies an individual, such as user IDs, name, home addresses, telephone numbers, genders, and ages of users who are registered in the matching service are registered as user information items. Note that FIG. 4 only illustrates some of the user information items, and various other information items such as the name of a school a user attends, and the name of a company a user works for, a user's academic history, the name of a school a user graduated from, the license or certification a user holds, a user's birth date, a user's approximate annual income, and a user's family structure may also be registered as user information items. The user IDs illustrated in FIG. 4 are identification information items of users in the matching service.

The message-content analysis processing unit 34 performs analysis processing on a conversation information that is to be transmitted to a chat partner by the chat processing control unit 31. When a plurality of users have a chat in which conversation information is transmitted and received between the users, the message-content analysis processing unit 34 determines whether conversation information that is to be transmitted to a chat partner includes information regarding an account on an external SNS by analyzing the conversation information.

More specifically, the message-content analysis processing unit 34 performs syntactic analysis on the conversation information that is to be transmitted to the chat partner so as to determine whether a conversation content includes information regarding an account on an external SNS. In the case where there is an SNS called "XXX", the message-content analysis processing unit 34 determines that a character string "abc123456" in a conversation content such as "My account on XXX is abc123456." or "My ID on XXX is abc123456." is information regarding an account on the SNS called "XXX".

Here, the information regarding an account on the external SNS includes a user ID or a user name on the external SNS and URL (abbreviation of uniform resource locator) information for accessing a user page on the external SNS. An image that represents a user ID, a user name, or URL information as a code which is, for example, a two-dimensional code such as QR code (Registered Trademark) is also included in information regarding an account on an external SNS.

More specifically, a user ID formed of single-byte alphanumeric characters, a user name such as "@yamada taro", and a URL such as "https://www.facebook.com/profile.php id=123456789" are determined to be information items regarding an account on an external SNS by the message-content analysis processing unit 34.

In the analysis processing, which is performed by the message-content analysis processing unit 34, when it is determined that conversation information to be transmitted to a chat partner includes information regarding an account on an external SNS, the external-SNS-information acquisition unit 35 accesses the external SNS server 40 by using the account information and acquires user information that is registered in association with the account information.

More specifically, the external-SNS-information acquisition unit 35 acquires various user information items that are registered in association with the account information, and example of the user information items include a user name, a home address, a place of residence, an occupation, a school name, a company name, and information regarding the content of a past post.

When the user information items acquired by the external-SNS-information acquisition unit 35 include information that identifies a corresponding user, the chat processing control unit 31 inhibits transmission of the conversation information, which the user tries to send to the chat partner. More specifically, when the user information registered in association with the information regarding the account on the external SNS matches at least some of the information items that are stored in the user-information storage unit 36 and that identify an individual, the chat processing control unit 31 inhibits transmission of the conversation information to be transmitted to the chat partner.

Note that information items each of which identifies an individual and each of which becomes a problem when it is leaked to another person include a name, a home address, a telephone number, a school name, and a company name, and thus, types of information that identifies an individual and that is used in a determination as to whether to allow transmission of conversation information may be limited in accordance with the type of information. For example, information items such as hobbies, an age, and a special skill may not be used in a determination of the existence or nonexistence of information that identifies an individual.

Figure 5:
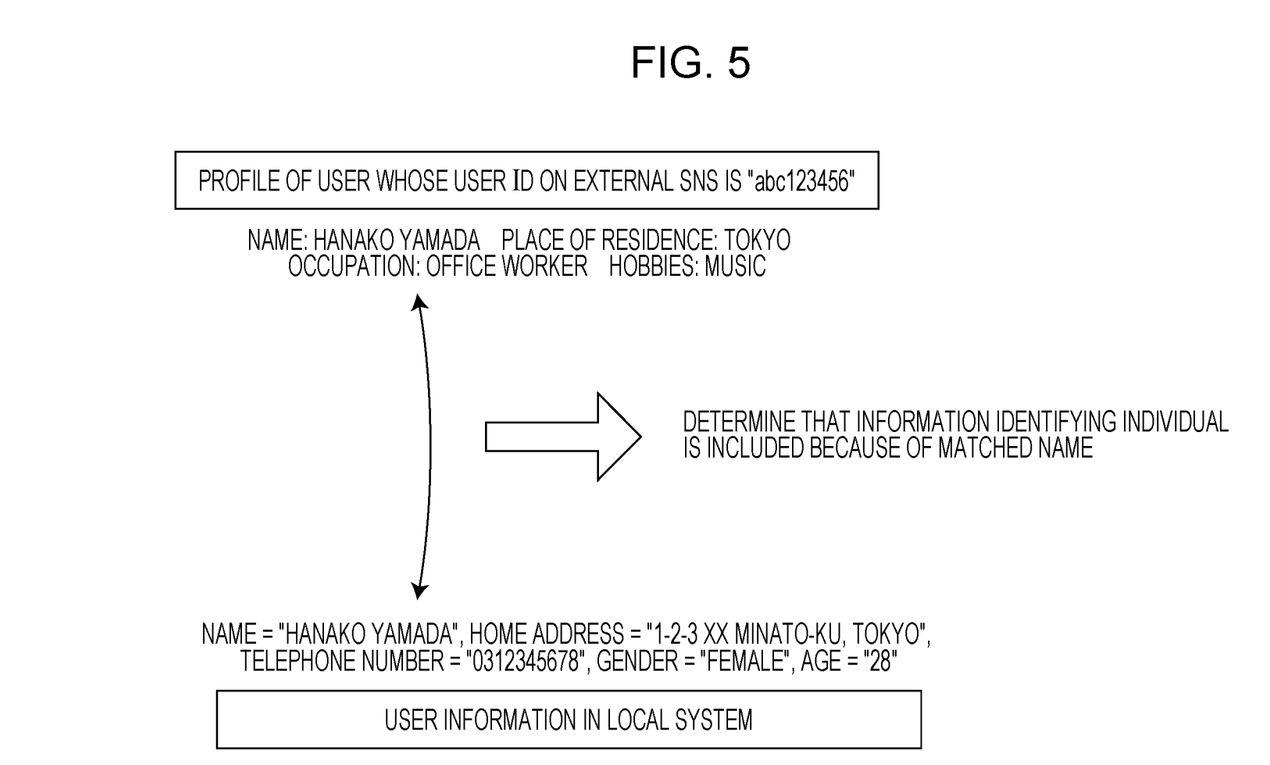
FIG. 5 is a diagram illustrating an example of a determination made by a chat processing control unit as to whether there is information that identifies an individual.

FIG. 5 illustrates an example of a determination made by the chat processing control unit 31 as to whether there is information that identifies an individual.

FIG. 5 illustrates the case where a user ID on an external SNS is "abc123456". It is assumed in the following description that the profile of a user whose user ID on the external SNS is "abc123456" is "Name: Hanako Yamada, Place of Residence: Tokyo, Occupation: Office worker, Hobbies: Music". In addition, it is assumed below that user information items of the user who tries to send the user ID to another user and that are registered in a local system include the following items: Name="Hanako Yamada", Home Address: ="1-2-3 XX Minato-ku, Tokyo", Telephone Number="0312345678", Gender="female", and Age="28".

In the above case, the user information item "Name='Hanako Yamada'" registered in the local system matches the information "Name: Hanako Yamada" that is registered in association with the account information "abc123456" on the external SNS, and thus, the chat processing control unit 31 determines that the account "abc123456" on the external SNS includes information that identifies an individual.

Note that, when the user information that is registered in association with the account information on the external SNS matches none of the information items that are stored in the user-information storage unit 36 and each of which identifies an individual, the chat processing control unit 31 transmits the conversation information to the other user who is a specified recipient.

Then, the chat processing control unit 31 causes the checking-result memory 32 to store a checking result of whether the user information that is registered in association with the account information on the external SNS includes information that identifies the user.

Accordingly, when conversation information that is to be transmitted to a chat partner includes account information the checking result of which is stored in the checking-result memory 32, the chat processing control unit 31 determines whether to inhibit transmission of the conversation information on the basis of the stored checking result.

Figure 6:
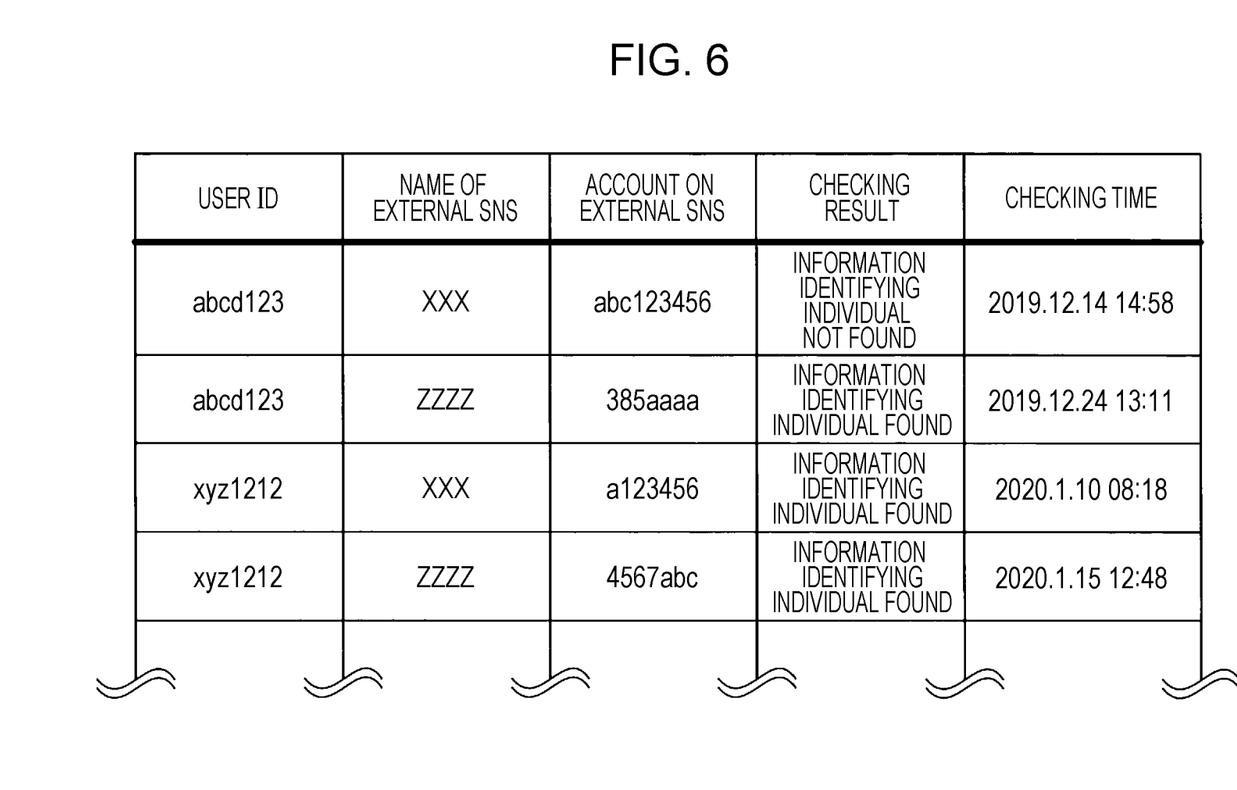
FIG. 6 is a diagram illustrating an example of checking results stored in a checking-result memory that is illustrated in FIG. 3.

FIG. 6 illustrates an example of checking results stored in the checking-result memory 32 illustrated in FIG. 3.

It is understood from the example of checking results illustrated in FIG. 6 that a user ID on the matching service, the name of an external SNS, an account on the external SNS that has undergone checking of the existence or nonexistence of information that identifies an individual, the checking result, and the checking time are stored so as to be associated with one another.

Note that, in the case where some time has elapsed since a checking result has been stored, information that identifies an individual may sometimes be included in a corresponding account on an external SNS, and there is a possibility that it may be falsely determined that information identifying an individual is not registered despite the fact that the information identifying an individual has been registered. Thus, the chat processing control unit 31 refers to the checking time, and when a predetermined period of time (e.g., one hour) has elapsed since the existence or nonexistence of information that identifies an individual has been checked, the external-SNS-information acquisition unit 35 checks again whether the account information includes information that identifies an individual and acquires the difference between the information included in the account one hour ago and the information currently included in the account so as to check whether the account includes new information that identifies an individual.

Note that, when account information that is included in conversation information to be transmitted to a chat partner is information regarding an account on an external SNS for which registration using a real name is a prerequisite, the chat processing control unit 31 inhibits transmission of the conversation information without causing the external-SNS-information acquisition unit 35 to acquire user information that is registered in association with the account information.

For example, the chat processing control unit 31 determines an external SNS from domain information included in the URL of the external SNS that is written in conversation information in a chat, and when the determined external SNS is Facebook (Registered Trademark), which recommends users to register using by their real names, the chat processing control unit 31 prohibits transfer of the conversation information to a chat partner upon determination of the external SNS. However, when the determined external SNS is, for example, Twitter (Registered Trademark) in which users may be registered anonymously, it is difficult to determine, by only determining the external SNS, whether information that identifies an individual is registered. Thus, the chat processing control unit 31 performs control in such a manner that the external-SNS-information acquisition unit 35 accesses the external SNS server 40 and determines whether information that identifies an individual is registered.

In addition, when a character string included in user information that is registered in association with account information that is included in conversation information to be transmitted to a chat partner represents a user's name stored in the user-information storage unit 36, the chat processing control unit 31 inhibits transmission of the conversation information without causing the external-SNS-information acquisition unit 35 to acquire the user information registered in association with the account information.

Figure 7:
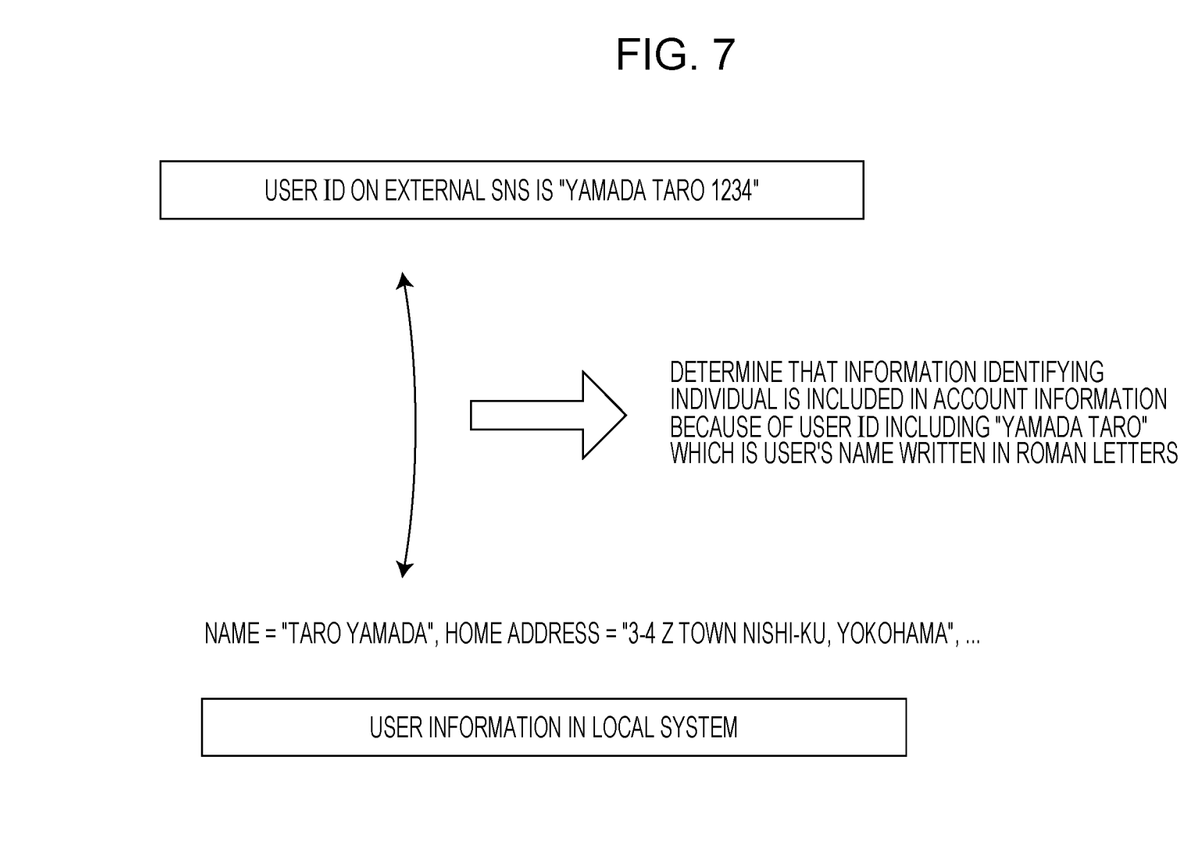
FIG. 7 is a diagram illustrating a specific example of the case where a determination as to whether there is information that identifies an individual is made by using only a user ID.

FIG. 7 illustrates a specific example of the case where the existence or nonexistence of information that identifies an individual is determined by using only a user ID as described above.

The case in which a user's user ID on an external SNS is a character string "YAMADA 1234" will now be described with reference to FIG. 7. When the user's information registered in the local system includes "Name='Taro Yamada'", a portion of a character string "YAMADA TARO", which is the user's name written in Roman letters, matches the user ID "YAMADA 1234" on the external SNS.

Thus, the chat processing control unit 31 determines that the user ID "YAMADA 1234" on the external SNS includes information that identifies an individual and inhibits transmission of the conversation information including this user ID to a chat partner.

Note that, although the case is described above in which only the user's last name matches the user ID, a determination similar to the above is made when only the user's first name matches the user ID. In addition, although the case is described above in which a determination is made by converting the user's name into Roman letters, a determination with higher accuracy may be made when a search in which kanji, katakana, and hiragana are considered to be letters having the same content is performed by using a commonly used algorithm for approximate string search, which is fuzzy search.

Note that, when conversation information that is to be transmitted to a chat partner includes information regarding an account on an external SNS, and the account information is set to private on the external SNS, the chat processing control unit 31 determines that it is unlikely that leakage of information that identifies an individual will occur and transmits the conversation information to a specified recipient, which is the chat partner. Here, when a user sets their information to private, the information may be disclosed only to the user or may be disclosed to, in addition to the user, an account of another user who is a friend of the user. Alternatively, the information may also be disclosed to another user who is a friend of the user's friend, and the state in which the information is disclosed to a friend of the user's friend may be considered as a public state.

Examples of a method of inhibiting transmission of conversation information, which is to be transmitted to a chat partner, by the chat processing control unit 31 include not only a method of simply cancelling the transmission of the conversation information to the chat partner but also a method of asking a user whether to cancel the transmission of the conversation information while the transmission is temporarily cancelled and then transmitting the conversation information to a specified recipient, which is the chat partner, when the user inputs an instruction to perform the transmission. Alternatively, the chat processing control unit 31 may display the fact that the account information which the user tries to send may include information that identifies an individual or may display a content that suggests changing the privacy settings of the account or changing the account name.

Operation of the matching-service providing server 10 of the present exemplary embodiment will now be described in detail with reference to the drawings.

Figure 8:
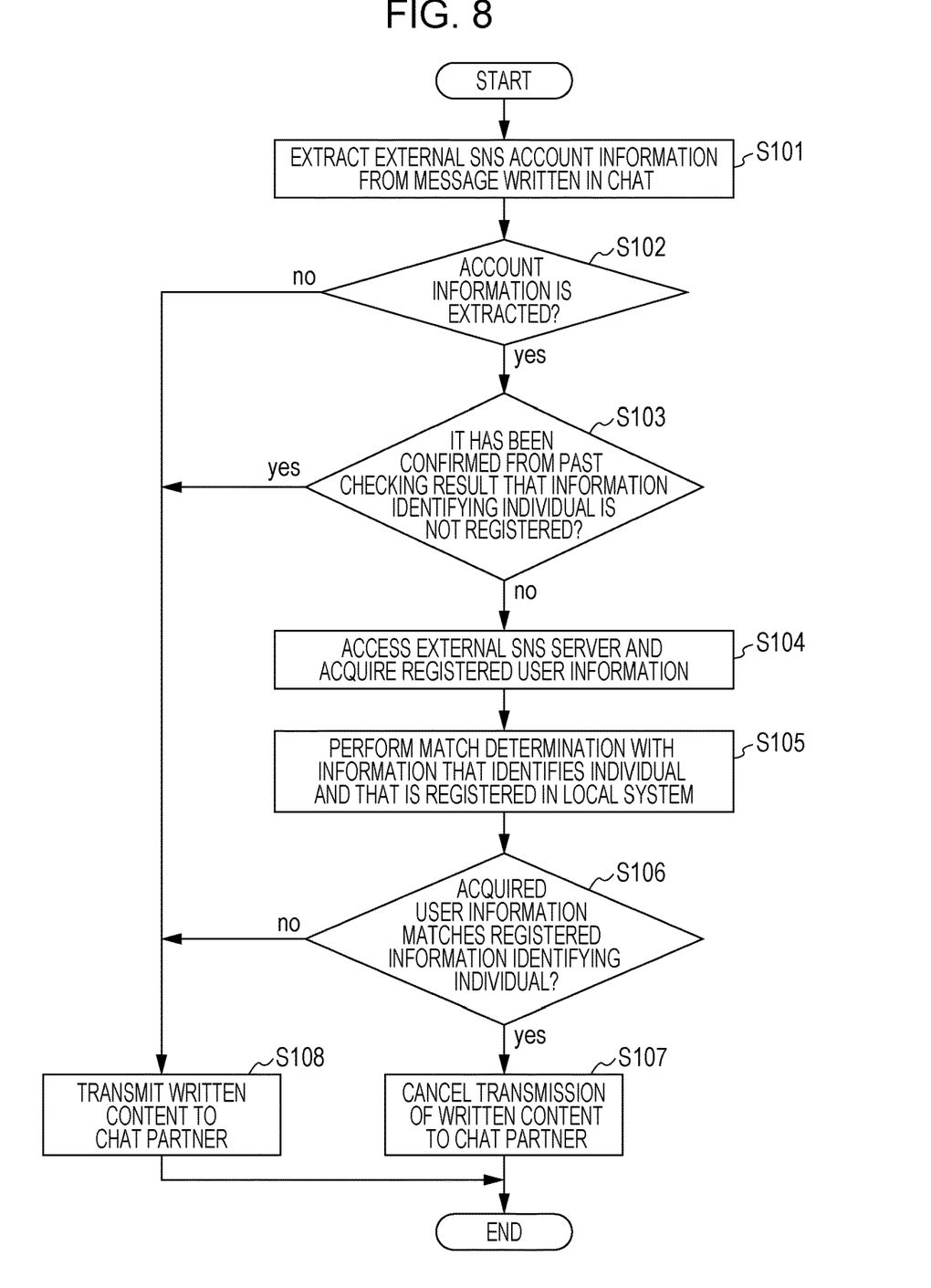
FIG. 8 is a flowchart illustrating an operation of the matching-service providing server according to the exemplary embodiment of the present disclosure.

First, the operation of the matching-service providing server 10 of the present exemplary embodiment will be described with reference to the flowchart illustrated in FIG. 8.

when users have a chat by transmitting and receiving conversation information to and from each other, and one of the users inputs an instruction to transmit conversation information to the other user, the message-content analysis processing unit 34 extracts, in step S101, information regarding an account on an external SNS from a content written in the chat.

Then, in step S102, the chat processing control unit 31 determines whether information regarding an account on an external SNS is extracted from the conversation content.

When it is determined in step S102 that information regarding an account on an external SNS is not extracted from the conversation content, the chat processing control unit 31 transmits the written conversation content as is to the chat partner in step S108.

When it is determined in step S102 that information regarding an account on an external SNS is extracted from the conversation content, in step S103, the chat processing control unit 31 refers to information regarding a past checking result stored in the checking-result memory 32 and determines whether it has been confirmed that information that identifies an individual is not registered in the account information.

In step S103, when a past checking result that corresponds to the information regarding the account on the external SNS is "information that identifies an individual is not found", the chat processing control unit 31 transmits the written conversation content as is to the chat partner in step S108.

In step S103, when no past checking result that corresponds to the information regarding the account on the external SNS is found, the chat processing control unit 31 controls, in step S104, the external-SNS-information acquisition unit 35 so as to access the external SNS server 40 and acquire registered user information.

Next, in step S105, the chat processing control unit 31 performs match determination between the acquired user information, which is registered in the external SNS, and information that is registered in the local system and that identifies individual.

Then, in step S106, the chat processing control unit 31 determines whether the acquired user information registered in the external SNS and the information that is registered in the local system and that identifies individual match each other.

In step S106, when the acquired user information registered in the external SNS and the information that is registered in the local system and that identifies individual do not match each other, the chat processing control unit 31 transmits the written conversation content as is to the chat partner in step S108.

In step S106, when the acquired user information registered in the external SNS and the information that is registered in the local system and that identifies individual match each other, the chat processing control unit 31 cancels the transmission of the written conversation content to the chat partner in step S107.

An overview of the operation in the matching-service providing server 10 illustrated in the above-described flowchart will now be described with reference to FIG. 9.

Figure 9:
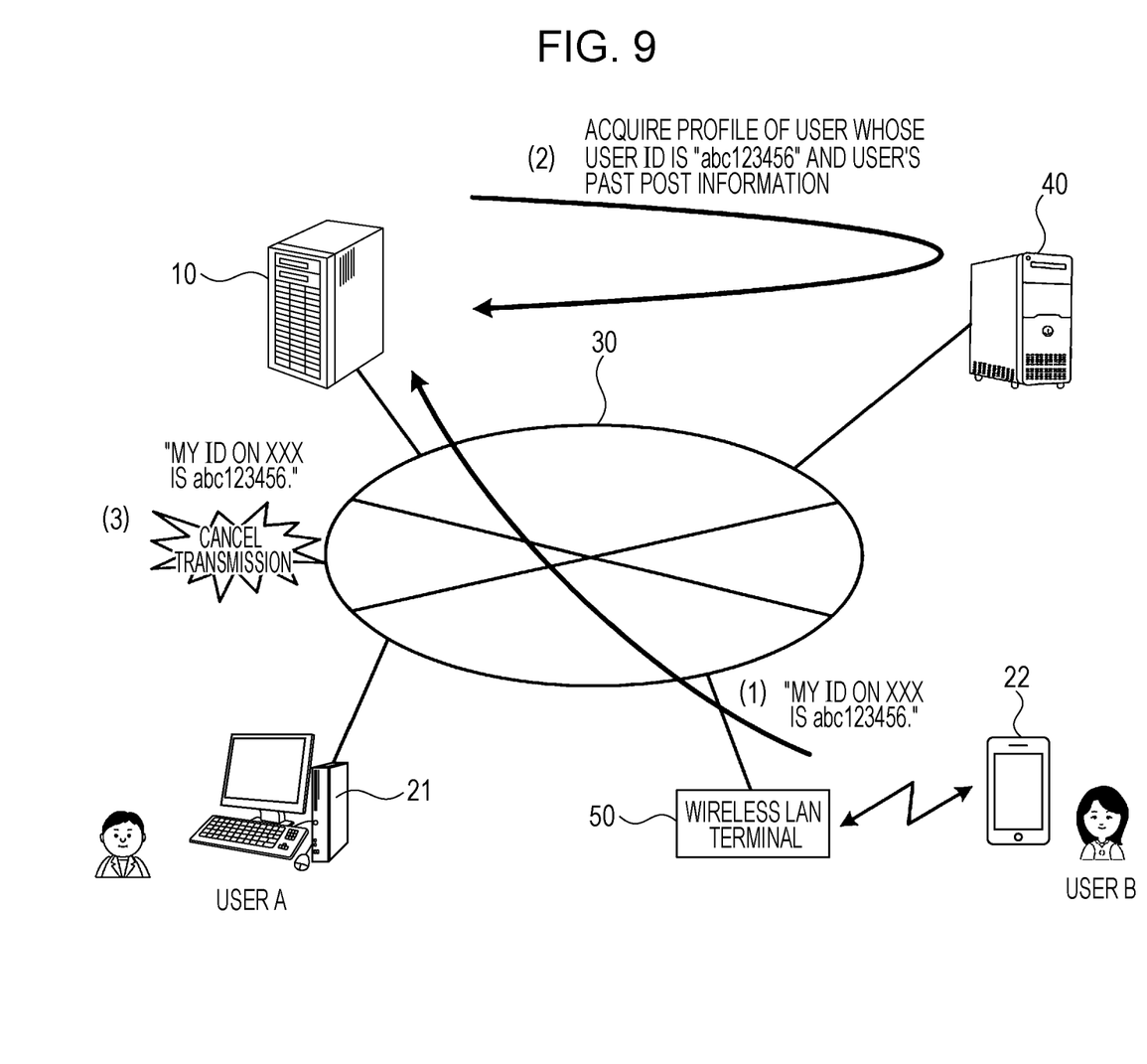
FIG. 9 is a diagram schematically illustrating an operation in the matching-service providing server.

FIG. 9 illustrates the case where the user B tries to send a conversation content "My ID on XXX is abc123456." to the user A, who is a chat partner, by using the terminal apparatus 22.

(1) When the user B tries to send the conversation content "My ID on XXX is abc123456." to the user A, who is the chat partner, the conversation information is transmitted to the matching-service providing server 10.

(2) Then, in the matching-service providing server 10, it is determined that the conversation information includes information regarding an account "abc123456" on an external SNS, and the matching-service providing server 10 accesses the external SNS server 40 and acquires various user information items such as a profile content and past post information that are registered to a user ID "abc123456".

(3) Subsequently, in the matching-service providing server 10, it is determined, by a method such as that described above, whether the user information items acquired from the external SNS server 40 include an information item that identifies the user, and when it is determined that an information item that identifies the user is included, transmission of the conversation content to the user A, who is the chat partner, is cancelled.

Figure 10:
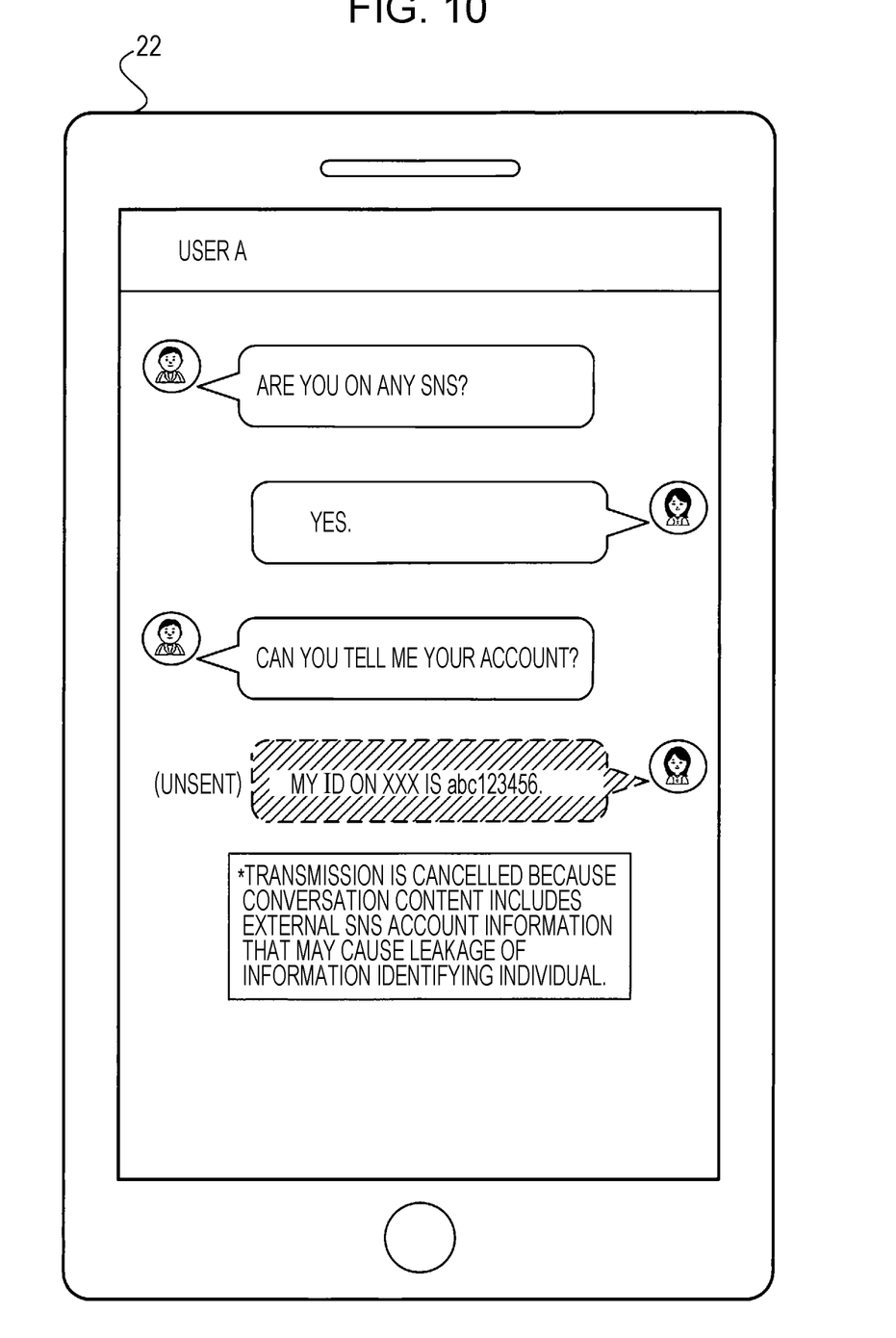
FIG. 10 is a diagram illustrating a screen example of a terminal apparatus of a user when transmission of conversation information to a chat partner is cancelled.

FIG. 10 illustrates a screen example of the terminal apparatus 22 of the user B when transmission of conversation content to a chat partner is cancelled in the manner described above.

Referring to FIG. 10, the conversation information "My ID on XXX is abc123456.", which the user B tries to send to the user A, is surrounded by a dashed line frame and displayed so as to be recognized as an unsent conversation information.

In addition, it is understood from FIG. 10 that a text "Transmission is cancelled because the conversation content includes external SNS account information that may cause leakage of information identifying an individual." is displayed below the unsent conversation information so as to indicate that the transmission of the conversation information, which the user B tries to send to the user A, is cancelled. Alternatively, a text that suggests changing the privacy settings of the account or changing the account name may be displayed.

Figure 11:
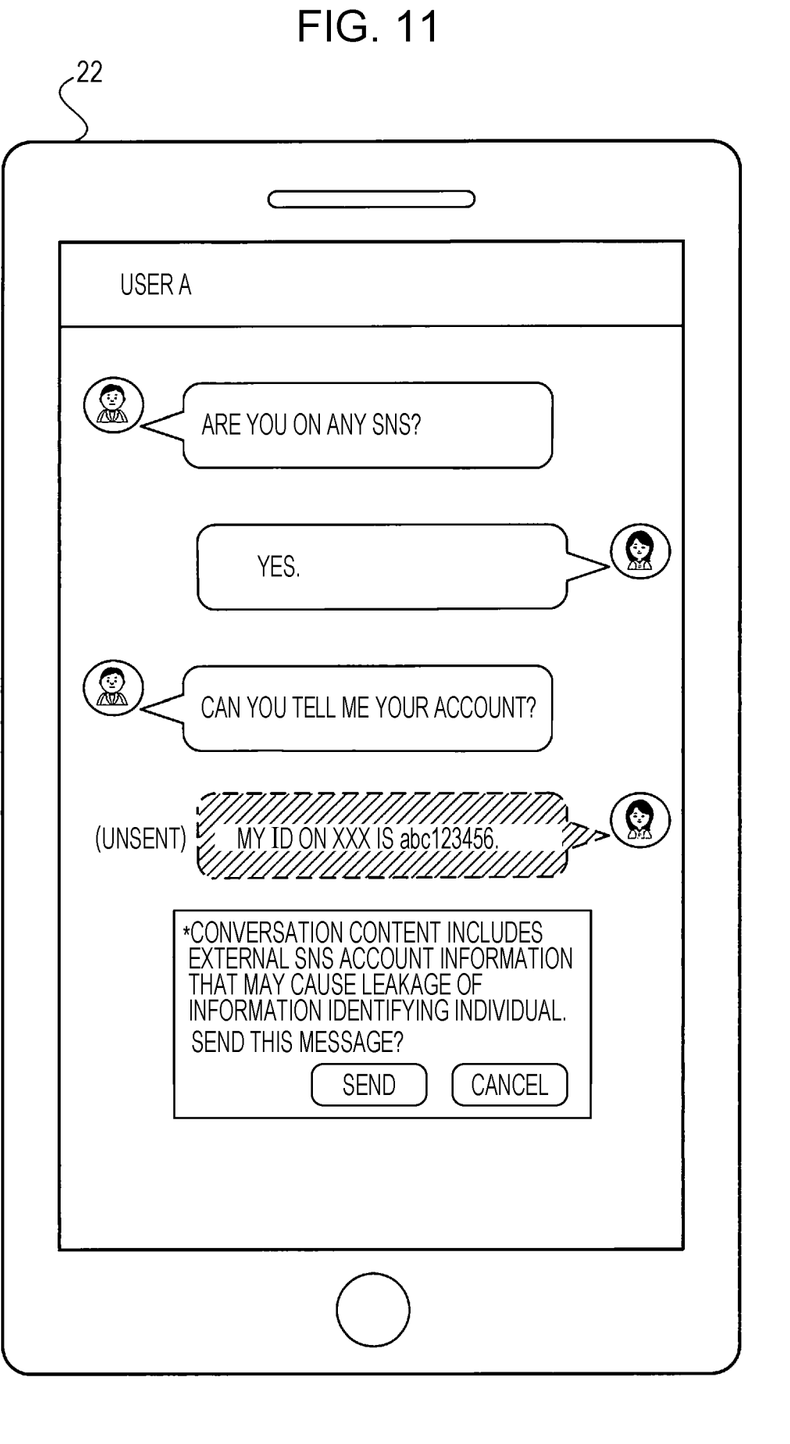
FIG. 11 is a diagram illustrating a screen example when a user is asked whether to cancel transmission of conversation information.

FIG. 11 illustrates a screen example in the case of asking a user whether to cancel transmission of conversation information instead of cancelling transmission of conversation information without any exception.

Similar to FIG. 10, the conversation information "My ID on XXX is abc123456.", which the user B tries to send to the user A, is displayed so as to be recognized as an unsent conversation information in the screen example illustrated in FIG. 11. However, it is understood from FIG. 11 that a text "The conversation content includes external SNS account information that may cause leakage of information identifying an individual. Send this message?" is displayed. When the user B selects "Send", the conversation information is transmitted as is to the user A, and when the user B selects "Cancel", the transmission of the conversation information to the user A is cancelled.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

In addition, in the above exemplary embodiment, although the case in which the present disclosure is applied to a chat function provided in a matching service has been described, the present disclosure is not limited to such a case and may also be applied to any service in which conversation information is transmitted and received between a plurality of users.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    memory; and
    a processor configured to
        when conversation information is transmitted and received between a plurality of users, and conversation information that one of the plurality of users tries to send includes information regarding an external service, acquire user information that is registered in association with the information regarding the service, and
        inhibit transmission of the conversation information when the acquired user information includes information that identifies the user,
    wherein the memory stores information that identifies each user who transmits and receives conversation information to and from another user, and
    wherein, when user information that is registered in association with the information regarding the external service does not match information that is stored in the memory and that identifies an individual, the processor transmits the conversation information to a specified recipient.

2. The information processing apparatus according to claim 1,
    wherein the memory stores information that identifies each user who transmits and receives conversation information to and from another user, and
    wherein, when user information that is registered in association with the information regarding the external service matches at least part of information that is stored in the memory and that identifies an individual, the processor inhibits transmission of the conversation information.

3. The information processing apparatus according to claim 1,
    wherein, when the information regarding the service included in conversation information to be transmitted is information regarding an account on an external social networking service for which registration using a real name is a prerequisite, the processor inhibits transmission of the conversation information without acquiring user information that is registered in association with the account information.

4. The information processing apparatus according to claim 2,
    wherein, when a character string of user information that is registered in association with the information regarding the service, which is included in conversation information to be transmitted, represents the user's name stored in the memory, the processor inhibits transmission of the conversation information.

5. The information processing apparatus according to claim 1,
    wherein, when the information regarding the service included in conversation information to be transmitted is information regarding an account on an external social networking service, and the account information is set to private on the social networking service, the processor transmits the conversation information to a specified recipient.

6. The information processing apparatus according to claim 1,
    wherein, when acquired user information includes information that identifies the user, the processor asks the user whether to cancel transmission of the conversation information, and when the user inputs an instruction to perform the transmission, the processor transmits the conversation information to a specified recipient.

7. The information processing apparatus according to claim 2,
    wherein, when acquired user information includes information that identifies the user, the processor asks the user whether to cancel transmission of the conversation information, and when the user inputs an instruction to perform the transmission, the processor transmits the conversation information to a specified recipient.

8. The information processing apparatus according to claim 3,
    wherein, when acquired user information includes information that identifies the user, the processor asks the user whether to cancel transmission of the conversation information, and when the user inputs an instruction to perform the transmission, the processor transmits the conversation information to a specified recipient.

9. The information processing apparatus according to claim 4,
    wherein, when acquired user information includes information that identifies the user, the processor asks the user whether to cancel transmission of the conversation information, and when the user inputs an instruction to perform the transmission, the processor transmits the conversation information to a specified recipient.

10. The information processing apparatus according to claim 5,
    wherein, when acquired user information includes information that identifies the user, the processor asks the user whether to cancel transmission of the conversation information, and when the user inputs an instruction to perform the transmission, the processor transmits the conversation information to a specified recipient.

11. A non-transitory computer readable medium storing a program causing a computer to execute a process, the process comprising:
    acquiring, when conversation information is transmitted and received between a plurality of users, and conversation information that one of the plurality of users tries to send includes information regarding an external service, user information that is registered in association with the information regarding the service;
    inhibiting transmission of the conversation information when the acquired user information includes information that identifies the user;
    storing information that identifies each user who transmits and receives conversation information to and from another user, and when user information that is registered in association with the information regarding the external service does not match information that is stored in memory and that identifies an individual, transmitting the conversation information to a specified recipient.

12. The information processing apparatus according to claim 1, wherein the processor is configured for:

in response to receiving an indication of the conversation information that (1) a user of the plurality of users requests to send in the written chat, and (2) includes information regarding an external service:

extracting external account information from the written chat, accessing an external server of the external service and acquire registered user information of the user, and determining whether the registered user information matches information identifying the user stored in a local system, and in response to the registered user information matching the information identifying the user stored in the local system, inhibit transmission of the conversation information when the acquired user information includes information that identifies the user.

13. An information processing apparatus comprising:

memory means; and means for, when conversation information is transmitted and received between a plurality of users, and conversation information that one of the plurality of users tries to send includes information regarding an external service, acquiring user information that is registered in association with the information regarding the service, and means for inhibiting transmission of the conversation information when the acquired user information includes information that identifies the user, wherein the memory means stores information that identifies each user who transmits and receives conversation information to and from another user, and wherein, when user information that is registered in association with the information regarding the external service does not match information that is stored in the memory means and that identifies an individual, the conversation information is transmitted to a specified recipient.

* * * * *